July 29, 1924.
A. H. SNYDER
STORAGE BATTERY
Filed Nov. 22, 1920
1,503,070
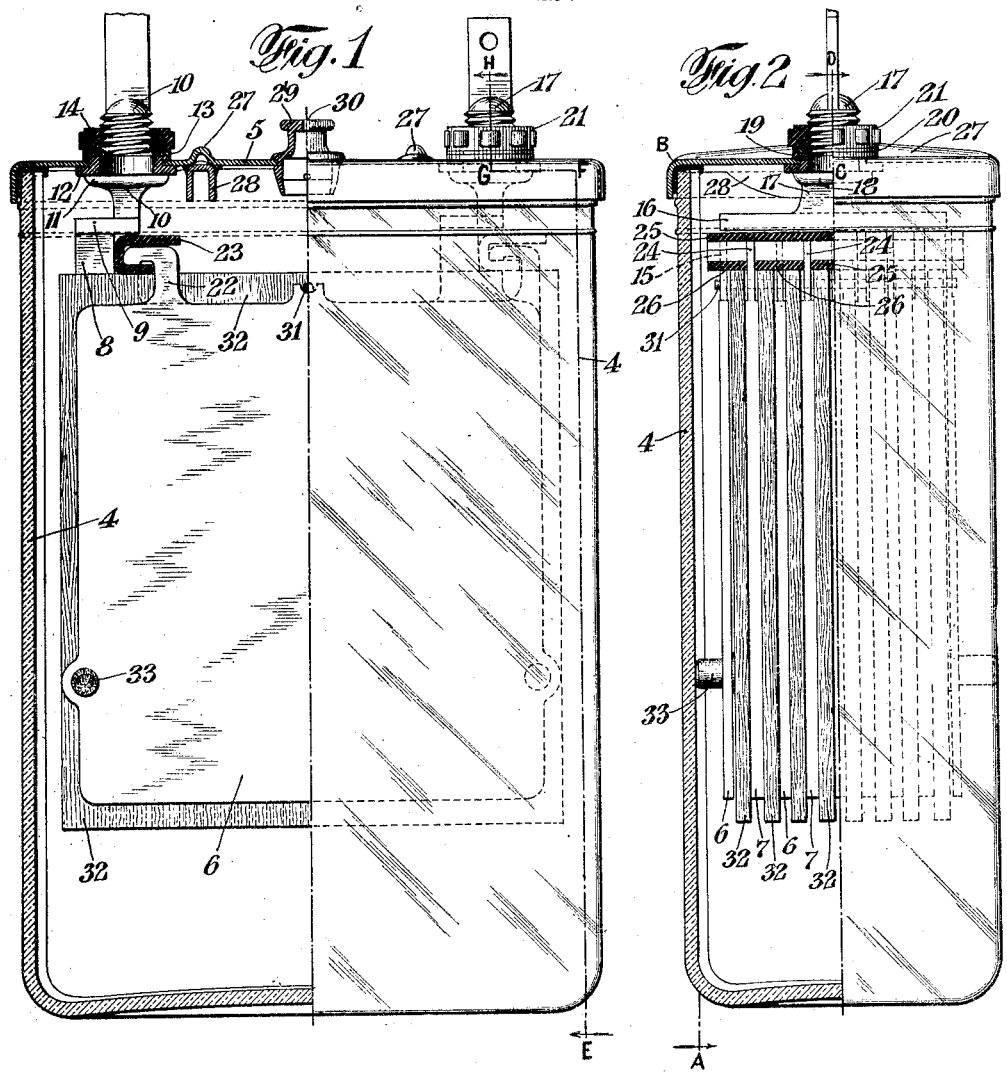
Inventor
Almond H. Snyder
By Graham Crosby
Attorney Patented July 29, 1924.

1,503,070

UNITED STATES PATENT OFFICE.

ALMOND H. SNYDER, OF LANCASTER, NEW YORK, ASSIGNOR TO GOULD STORAGE BATTERY COMPANY, A CORPORATION OF NEW YORK.

STORAGE BATTERY.

Application filed November 22, 1920. Serial No. 425,629.

*To all whom it may concern:*

Be it known that I, ALMOND H. SNYDER, a citizen of the United States, and a resident of Lancaster, in the county of Erie and State of New York, have invented certain new and useful Improvements in Storage Batteries, of which the following is a specification.

My invention relates to improvements in storage batteries and more particularly to batteries in which are provided a set of positive plates connected to a common terminal and a set of negative plates connected to a common terminal with suitable separators between the plates, the whole being included in a suitable glass jar or container provided with a suitable cover.

One object of the invention is to provide such an arrangement in which both sets of plates are suspended in the container supported by a cover of antimony lead alloy. Such a cover is not only acid resisting but is capable of supporting both sets of plates, whereby plates are easily removed by lifting off the cover, and, the use of separate or complicated supporting means are unnecessary. A further object of my invention is to so reinforce such an antimony lead cover as to reduce the sagging of the cover due to the weight of the plates supported thereby. A further object of my invention is to provide such a cover with ribs between the terminal lugs to prevent acid from reaching from one terminal to the other across the top of the cover. A further object of the invention is to provide improved arrangement for supporting the plates from the cover by the terminal lugs and insulating the lugs from the cover. A further object of the invention is to provide improved means for spacing the end or outside plates away from the sides of the jar or container to prevent the body of the plates from swinging against or engaging the sides of the container. Further objects, features and advantages will more clearly appear from the detail description given below taken in connection with the accompanying drawings which form a part of this specification.

In the drawings, Fig. 1 is a side elevation of a battery embodying my improvements in a preferred form thereof, the same being shown partly in section, taken on the line A, B, C, D of Fig. 2; Fig. 2 is an end elevation of the same partly in section, taken on the line E, F, G, H of Fig. 1; and Fig. 3 is a top plan view of the battery.

Referring to the drawings, 4 represents a suitable glass jar container provided with a cover 5 constructed of an alloy of lead and antimony so that it is not only acid-resisting but the metal is far more rigid than would be if the cover was made of pure lead. The cover 5 is provided with an integral depending peripheral flange along its edge, between which flange and the top part of the container 4 is placed a suitable sealing compound as shown in Figs. 1 and 2. Within the jar 4 are arranged a set of negative plates 6 and a set of positive plates 7. The positive plates at their upper edges on one end are provided with upwardly extending integral connecting parts 8 integrally connected to a common bus bar 9 which in turn is integral with a positive terminal lug 10 provided with a flange 11 which is adapted to be drawn snugly up against a soft rubber bushing 12 surrounding the lug 10 where it passes through the cover 5 so as to thoroughly insulate the lug from the metal cover. Above the cover on top of the bushing 12 is placed a hard rubber washer 13 and on top of this there is screwed down on the lug 10 a hard rubber nut 14 so that all the parts are brought firmly together and held rigidly together as shown in Fig. 1. The hard rubber washers 13 may in some cases be omitted. In a similar manner the negative plates 6 are provided with upwardly extending integral projections 15 at the other end of the plates, which projections are integrally connected with a common bar 16 which is integrally connected with a negative terminal lug 17 having a flange 18 bearing against the underneath side of a soft rubber bushing 19 surrounding the lug where it passes through the cover. On top of the bushing 19 is a hard rubber washer 20 and screwed down on this on the lug 17 is a hard rubber nut 21.

At their free ends, the negative plates are provided with integral hooks 22 extending upwardly from the upper edges of the plates, which hooks extend into members 23 U-shaped in cross section, as shown in Fig. 1. The U-shaped members 23 are made of insulating material such as hard rubber and extend transversely across the top of the positive plates underneath the bar 9 and are supported by the positive plates so that the free ends of the negative plates are supported by the positive plates through the insulating bar 23. In a similar manner the free ends of the positive plates are provided with upwardly extending integral hook shaped portions 24 engaging into a U-shaped bar 25, which is exactly similar to the bar 23 and rests upon the top of the negative plates at 26 and extends under the bar 16, so that the free ends of the positive plates are supported by the terminal ends of the negative plates through the insulating member 25. In this manner both sets of plates are firmly locked together and suspended in the cell by being wholly supported from the antimony lead cover 5 through the terminal lugs 10 and 17.

The cover being composed of antimony-lead, the usual shocks and blows to which the battery is subjected in shipment and handling, are prevented from substantially injuring the cover by reason of the weight of the plates supported thereby. If a hard rubber cover were used to support the plates it would soften when the battery was warm which would tend to cause the plates and cover to sag and when cold the hard rubber cover would be brittle whereby the shocks and blows which the battery would probably receive in shipment or handling would likely crack and break the cover particularly because of the weight of the plates supported thereby. Also the natural cushion effect of the antimony-lead where it comes in contact with the container or jar serves to reduce damage to the jar or sealing means due to rough handling.

In order to reduce the sagging of the cover 5 due to the weight of the plates I show ribs 27 struck up in the cover 5 and extending transversely across the same between the two terminal lugs. These ribs serve as reinforcing means to reduce the sagging of the cover due to the weight of the plates. They also prevent acid which may be condensed on the cover from reaching from one battery terminal to the other across the top of the cover. Further reinforcing means may be provided if desired in the form of U-shaped cross bars or ribs 28 made of antimony lead alloy and burned or otherwise secured on the underneath side of the cover preferably underneath the ribs 27. In the center of the cover there is provided an aperture or hole through which the battery may be filled, this aperture or hole being normally closed by a soft rubber vent plug 29. The vent plug 29 is preferably made hollow as shown so that it is easily squeezed to be inserted or removed from the aperture in the cover. It is provided with a vent opening 30 in its top, and a circumferential groove engaging the cover.

31 represents a bar of insulating material such as hard rubber extending transversely of the plates and centrally along the top portion thereof in recesses in the top edges of the plates as shown in Fig. 1 so that the bar 31 is supported thereby and this bar 31 extends through holes in wood separators 32 adjacent the top edge of the separators and centrally thereof so that the separators are efficiently supported by the plates through the cross bar 31. The wood separators 32 are placed between adjacent positive and negative plates in a manner well understood by those skilled in the art.

In order to prevent the body of the battery plates from swinging or engaging the sides of the jar, I provide the outside negative plates 6 with soft rubber projections or buttons 33 which are adapted to engage the sides of the jar or container to prevent the body portion of the plates from swinging against or engaging the sides of the container. The projections 33 are preferably located adjacent the side edges of the plates and toward the bottom thereof. Provision of these soft rubber buttons or projections 33 tends to reduce breakage or damage during the handling or transportation of the battery cells. The rubber projections 33 are preferably secured in place by being tightly squeezed through openings in the antimony lead framework of the plates. As shown, the rubber buttons 33 are provided with a thin integral flange on the inside face of the plates through which they extend.

While I have described my improvements in great detail and with respect to preferred forms thereof, I do not desire to be limited to such details or forms since many changes and modifications may be made and the improvements embodied in widely different forms without departing from the spirit and scope of the invention in its broader aspects.

What I claim as new and desire to secure by Letters Patent is:

1. A storage battery having in combination a container, a cover therefor, a set of storage battery negative and positive plates in the container and supported by said cover, said cover being composed of antimony-lead whereby the usual shocks and blows to which the battery is subjected in shipment and handling are prevented from substantially injuring the battery by reason of the weight of the plates supported thereby.

2. A storage battery having in combination a container, a cover therefor, a set of storage battery negative and positive plates in the container and supported by said cover, said cover being composed of antimony-lead whereby the usual shocks and blows to which the battery is subjected in shipment and handling are prevented from substantially injuring the battery by reason of the weight of the plates supported thereby; and said cover having reinforcing means to prevent any material sagging of the cover due to the weight of the plates supported thereby.

3. A storage battery having in combination a container, a cover therefor, a set of positive storage battery plates, a set of negative storage battery plates, a terminal lug to which the positive plates are connected, a terminal lug to which the negative plates are connected, said lugs extending through the cover and being secured with respect thereto to support said plates from the cover, said cover being reinforced and composed of antimony-lead whereby the usual shocks and blows to which the battery is subjected in shipment and handling are prevented from substantially injuring the battery by reason of the weight of the plates supported thereby.

4. A storage battery having in combination a container, a cover therefor, a set of positive storage battery plates, a set of negative storage battery plates, a terminal lug to which the positive plates are connected, a terminal lug to which the negative plates are connected, said lugs extending through the cover and being secured with respect thereto to support said plates from the cover, said cover being composed of antimony-lead whereby the usual shocks and blows to which the battery is subjected in shipment and handling are prevented from substantially injuring the battery by reason of the weight of the plates supported thereby and said cover being provided with reinforcing ribs extending across the cover to prevent any material amount of sagging of the cover due to the weight of the plates supported thereby.

5. A storage battery having in combination a container, a cover therefor, a set of storage battery negative and positive plates in the container and separators between the respective positive and negative plates, said plates and separators being supported by said cover and said cover being composed of antimony-lead whereby the usual shocks and blows to which the battery is subjected in shipment and handling are prevented from substantially injuring the cover by reason of the weight of the plates supported thereby.

6. A storage battery having in combination a container, a cover therefor, a set of storage battery negative and positive plates in the container, and separators between the respective positive and negative plates, said plates and separators being supported by said cover and said cover being composed of antimony-lead whereby the usual shocks and blows to which the battery is subjected in shipment and handling are prevented from substantially injuring the battery by reason of the weight of the plates supported thereby, and said cover being sealed to the container at the edges and reinforced to prevent any material sagging of the cover due to the weight of the plates supported thereby.

7. A storage battery having in combination a container, a cover therefor, a set of positive storage battery plates, a set of negative storage battery plates, separators between the positive and negative plates and supported by the plates, a terminal lug to which the positive plates are connected, a terminal lug to which the negative plates are connected, said lugs extending through the cover and being secured with respect thereto to support said plates and separators from the cover, said cover being composed of antimony-lead whereby the usual shocks and blows to which the battery is subjected in shipment and handling are prevented from substantially injuring the battery by reason of the weight of the plates supported thereby, and said cover being provided with reinforcing ribs extending across the cover to prevent any material amount of sagging of the cover due to the weight of the plates supported thereby.

8. A storage battery having in combination a container, a cover therefor, a set of positive plates and a set of negative plates in the container, and supported from said cover a terminal lug to which the positive plates are connected, a terminal lug to which the negative plates are connected, said terminal lugs extending through said cover, soft rubber bushings surrounding said lugs where they pass through the cover, and hard rubber nuts screwed down on the terminal lugs above said bushings to hold the parts in place, said soft rubber bushings extending over the top of the cover whereby the soft rubber bushings serve as cushions supporting the weight of the plates.

9. A storage battery having in combination a container, an antimony lead cover therefor, a set of positive plates and a set of negative plates in the container, separators between adjacent positive and negative plates, a terminal lug to which the positive plates are connected, a terminal lug to which the negative plates are connected, said terminal lugs extending through said cover, and serving to support both sets of plates and separators from said cover, soft rubber bushings surrounding said lugs where they pass through the cover, hard rubber washers surrounding the terminal lugs on top of the bushings, and hard rubber nuts screwed down on the terminal lugs against said washers to hold the parts in place, said soft rubber bushings extending over the top of the cover whereby the soft rubber bushings serve as cushions supporting the weight of the plates.

10. A storage battery having in combination a container, an antimony lead cover for the container, a set of negative battery plates, a set of positive battery plates, separators between adjacent positive and negative plates and means for supporting both sets of plates in the container from the antimony lead cover, said cover being provided with a depending flange along its edge and a sealing compound between said flange and the top part of the container.

11. A storage battery having in combination a container, an antimony lead cover for the container, a set of negative battery plates, a set of positive battery plates, separators between adjacent positive and negative plates and means for supporting both sets of plates in the container from the antimony lead cover, and projections of soft rubber between the outside plates and the sides of the container preventing the body of the plates from swinging against or engaging the sides of the container.

12. A storage battery having in combination a container, a cover therefor, a set of positive plates in the container, a set of negative plates in the container, separators between adjacent positive and negative plates, and a bar of insulating material extending transversely of the plates centrally along the top portion thereof and supported thereby and extending through the separators so as to support the separators from the plates.

13. A storage battery having in combination a container, an antimony lead cover for the container, a set of negative battery plates, a set of positive battery plates, separators between adjacent positive and negative plates and means for supporting both sets of plates in the container from the antimony lead cover, and a bar of insulating material extending transversely of the plates along the top portion thereof and supported thereby and extending through the separators so as to support the separators.

Signed at Depew in the county of Erie and State of New York this 19th day of November A. D. 1920.

ALMOND H. SNYDER.